US 11,480,250 B2

(12) United States Patent
Balsells

(10) Patent No.: US 11,480,250 B2
(45) Date of Patent: Oct. 25, 2022

(54) V-SPRINGS AND SEALS WITH V-SPRINGS

(71) Applicant: Bal Seal Engineering, LLC, Foothill Ranch, CA (US)

(72) Inventor: Peter J. Balsells, Newport Beach, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 0 days.

(21) Appl. No.: 15/923,892

(22) Filed: Mar. 16, 2018

(65) Prior Publication Data
US 2018/0266562 A1 Sep. 20, 2018

Related U.S. Application Data

(60) Provisional application No. 62/472,333, filed on Mar. 16, 2017.

(51) Int. Cl.
*F16J 15/3212* (2016.01)
*F16J 15/328* (2016.01)
*F16J 15/3236* (2016.01)

(52) U.S. Cl.
CPC ......... *F16J 15/3212* (2013.01); *F16J 15/328* (2013.01); *F16J 15/3236* (2013.01)

(58) Field of Classification Search
CPC .. F16J 15/3208; F16J 15/3212; F16J 15/3232; F16J 15/3236
See application file for complete search history.

(56) References Cited

U.S. PATENT DOCUMENTS

| 1,938,249 | A | * | 12/1933 | Fretter | F16C 33/74 267/161 |
| 1,958,120 | A | * | 5/1934 | Tuxbury | F16C 33/74 267/161 |
| 2,088,703 | A | | 8/1937 | Hubbard et al. | |
| 2,434,484 | A | * | 1/1948 | Chambers, Jr. | F16J 15/3212 277/553 |
| 2,521,145 | A | * | 9/1950 | Frank | F16J 15/3212 277/437 |
| 2,630,343 | A | * | 3/1953 | Jones | F16J 15/3208 267/162 |
| 3,114,561 | A | * | 12/1963 | Creath | F16J 15/121 277/555 |

(Continued)

FOREIGN PATENT DOCUMENTS

DE 20 2008 017339 U1 10/2009

OTHER PUBLICATIONS

Extended European Search Report from European Patent Office on co-pending EP application (EP18162396.8) dated Jul. 3, 2018.

(Continued)

*Primary Examiner* — Nicholas L Foster
(74) *Attorney, Agent, or Firm* — KOS IP Law LLP

(57) ABSTRACT

V-springs each with a plurality of V-bodies and wherein each V-body has two legs, one shorter than the other. Seal assemblies each with a sealing element having a spring cavity and having a V-spring located therein, the V-spring having a plurality of V-bodies and wherein each V-body each comprising two legs, a long leg that is longer in length than a short leg. The long leg, the short leg, or both long and short legs of the V-bodies can each have one or more bends or inflection points to change a projection of the long leg, the short leg, or both.

15 Claims, 4 Drawing Sheets

(56) References Cited

U.S. PATENT DOCUMENTS

| | | | | |
|---|---|---|---|---|
| 3,901,517 A | * | 8/1975 | Heathcott | F16J 15/3208 277/556 |
| 4,508,356 A | * | 4/1985 | Janian | F16J 15/3208 267/1.5 |
| 4,655,945 A | | 4/1987 | Balsells | |
| 4,804,290 A | | 2/1989 | Balsells | |
| 4,805,943 A | | 2/1989 | Balsells | |
| 5,072,070 A | | 12/1991 | Balsells | |
| 5,079,388 A | | 1/1992 | Balsells | |
| 5,091,606 A | | 2/1992 | Balsells | |
| 5,117,066 A | | 5/1992 | Balsells | |
| 5,134,244 A | | 7/1992 | Balsells | |
| 5,161,806 A | | 11/1992 | Balsells | |
| 5,163,692 A | * | 11/1992 | Schofield | F16J 15/3236 277/436 |
| 5,265,890 A | | 11/1993 | Balsells | |
| 5,358,224 A | | 10/1994 | Balsells | |
| 5,474,309 A | | 12/1995 | Balsells | |
| 5,575,487 A | | 11/1996 | Balsells | |
| 5,599,027 A | | 2/1997 | Balsells | |
| 5,630,591 A | * | 5/1997 | Drijver | F16J 15/025 277/553 |
| 5,799,953 A | * | 9/1998 | Henderson | F16J 15/3236 277/554 |
| 5,979,904 A | | 11/1999 | Balsells | |
| 5,984,316 A | | 11/1999 | Balsells | |
| 5,992,856 A | | 11/1999 | Basells et al. | |
| 6,050,572 A | | 4/2000 | Balsells et al. | |
| 6,161,838 A | | 12/2000 | Balsells | |
| 6,264,205 B1 | | 7/2001 | Balsells | |
| 6,641,141 B2 | | 11/2003 | Schroeder | |
| 7,210,398 B2 | | 5/2007 | Balsells | |
| 7,464,750 B2 | | 12/2008 | Schapel et al. | |
| 8,096,559 B2 | | 1/2012 | Cook | |
| 8,251,373 B2 | * | 8/2012 | Lev | F16J 15/3236 277/442 |
| 8,328,202 B2 | | 12/2012 | Foster et al. | |
| 8,544,850 B2 | | 10/2013 | Balsells et al. | |
| 8,684,362 B2 | | 4/2014 | Balsells et al. | |
| 9,121,507 B2 | * | 9/2015 | Ghalambor | F16J 15/3212 |
| 9,182,041 B2 | * | 11/2015 | Daub | F16J 15/3212 |
| 9,194,497 B2 | | 11/2015 | Rastegar | |
| 9,234,591 B2 | | 1/2016 | Dilmaghanian et al. | |
| 9,285,034 B2 | | 3/2016 | Balsells et al. | |
| 9,357,684 B2 | | 5/2016 | Foster | |
| 9,920,837 B2 | * | 3/2018 | Tadano | F16J 15/3212 |
| 2002/0153664 A1 | * | 10/2002 | Schroeder | F16J 15/002 277/551 |
| 2010/0237565 A1 | | 9/2010 | Foster | |
| 2011/0006486 A1 | | 1/2011 | Niknezhad | |
| 2011/0012313 A1 | * | 1/2011 | Lev | F16J 15/3236 277/562 |
| 2011/0140369 A1 | * | 6/2011 | Lenhert | F16J 15/3236 277/589 |
| 2011/0156361 A1 | * | 6/2011 | Ghalambor | F16J 15/3212 277/589 |
| 2011/0272892 A1 | * | 11/2011 | Grace | F16J 15/3212 277/395 |
| 2013/0043661 A1 | | 2/2013 | Binder et al. | |
| 2014/0312570 A1 | | 10/2014 | Foster | |
| 2014/0360020 A1 | * | 12/2014 | Ghalambor | F16J 15/3212 29/896.9 |
| 2016/0047473 A1 | | 2/2016 | Foster et al. | |
| 2016/0223086 A1 | | 8/2016 | Balsells et al. | |
| 2017/0172018 A1 | | 6/2017 | Dilmaghanian et al. | |
| 2017/0261108 A1 | | 9/2017 | Soler et al. | |
| 2017/0328474 A1 | | 11/2017 | Balsells | |

OTHER PUBLICATIONS

Extended European Search Report from European Patent Office on co-pending EP application (EP20171510.9) dated Jun. 24, 2020.

* cited by examiner

V-SPRINGS AND SEALS WITH V-SPRINGS

FIELD OF THE INVENTION

The present invention generally relates to springs, and particularly to V-springs. Aspects of the invention further includes spring energized seals that, more particularly, contain a V-spring for biasing the two flanges of a sealing member. The V-springs can contain a short leg and a longer leg with an apex or joint located between the two legs.

BACKGROUND

V-springs and V-spring energized seals are known in the industry and are typically known to offer good performance in applications that involve scraping and dynamic reciprocating or rotary sealing.

Prior art spring energized seals can comprise seal elements energized with springs that utilize a V-shaped energizing component with legs of equal length. The seal assembly with the prior art V-spring prevents or reduces media from entering under the tip of the sealing element's sealing lip due to the loading point of the v-shaped energizing component being concentrated at or near the edge of the sealing element's lip.

SUMMARY

Seal assemblies presented herein comprise a sealing element or member with a body comprising an outside flange, an inside flange, and a center channel section collectively defining a spring cavity. Optionally a locking ring can be included an part of the spring cavity can comprise the locking ring. A V-spring shaped energizing component can be placed in the spring cavity. In an example, the V-spring can have a plurality of interconnected V-bodies each with a short leg and a longer leg. The sealing element can similarly have an outside flange that is longer than the inside flange with the inside flange having a sealing lip for sealing again a surface, such as a pin or a shaft. The exterior surface of the outside flange for sealing against a housing, cartridge, or gland element may also be described as a sealing lip.

To some, a V-spring can look like a U-spring. Thus, as used herein, V-springs and U-springs are synonymous provided the two legs of each body connecting to a joining connecting end are used for biasing two structures away from one another. For example, the two legs of the V-body, or U-body, can be used to bias an inside flange and an outside flange of a sealing element away from one another.

The V-bodies with different leg lengths can align with the flanges having the corresponding long and short flange lengths. When the V-spring is mounted within the spring groove of the sealing element, the long and short legs should recess from the ends of the outer and inner flanges, respectively. In some examples, at least the short legs of the V-spring can be approximately equal or only slightly recessed from the end of the inner flange.

The varied lengths of the V-spring legs and the sealing lips of the sealing element provide advantages over prior art spring energized seals. Among other things, these advantages include lower temperature at the sealing interface, reduced lifting of the seal lip, and an increase in sealing force.

Additional advantages of the present spring energized seal assemblies include higher sealing force and increased seal lip stiffness, reduced temperature due to reduced length of contact, as well as a reduction of unwanted lifting of the seal lip caused by sealing surface eccentricities during dynamic sealing or due to vibration or shock, wherein the diminished length decreases mass and reduces inertia of the seal lip and thus increases sealing ability.

Aspects of the present invention include a seal assembly comprising: a sealing element having an inside flange with a sealing lip, an outside flange with a sealing lip, and a center channel section defining a spring cavity, said outside flange extending in a first direction a longer distance than said inside flange; a V-spring located in the spring cavity, said V-spring comprising a plurality of V-bodies and wherein each V-body comprises a long leg extending in the first direction a longer distance than a short leg; and wherein said short leg has a terminal edge and wherein said short leg is biased against an inside surface of said inside flange. Alternatively, the short leg can have a terminal edge and wherein said short leg is biased against an inside surface of said outside flange.

The short leg can have a bend or an inflection point and said bend or inflection point forming a terminal end section having a different profile than a base section of the short leg.

The seal assembly can comprise a surface and a sealing interface; and wherein said sealing lip of said inside flange or said out flange seals against said surface.

The sealing interface can be a contact area between said sealing lip and said surface.

The sealing interface can be smaller than a sealing interface of another seal assembly in which a V-body of a V-spring comprises two legs that are substantially the same, such as substantially the same in length.

The temperature at the sealing interface can be less than the temperature at the sealing interface of another seal assembly in which a V-body of a V-spring comprises two legs that are substantially the same, such as substantially the same in length.

The short leg can comprise an inertia that is less than an inertia of another seal assembly that is only different by the short leg being equal to the long leg in length and thus an increase in sealing ability during dynamic operation, vibration, or shock.

The short leg can provide an increase in seal force compared to the seal force of another seal assembly that is only different by the short leg being equal to the long leg in length.

The long leg can have a bend or an inflection point and said bend or inflection point forming a terminal end section having a different profile than a base section of the long leg.

The long leg can have more than one inflection points.

The short leg can have more than one inflection points.

The seal assembly can further comprise a backing ring.

The seal assembly can further comprise a locking ring.

Aspects of the present disclosure further include a method of manufacturing a seal assembly. The method can comprise: forming a sealing element, said a sealing element having an inside flange with a sealing lip, an outside flange with a sealing lip, and a center channel section defining a spring cavity, said outside flange extending in a first direction a longer distance than said inside flange; placing a V-spring in the spring cavity, said V-spring comprising a plurality of V-bodies and wherein each V-body comprises a long leg extending in the first direction a longer distance than a short leg; and wherein said short leg has a terminal edge and wherein said short leg is biased against an inside surface of said inside flange or biased against an inside surface of sand outside flange.

The method wherein the short leg and the long leg can be joined at a connecting portion.

The short leg can have a base with a width and the terminal edge can have a width, and wherein the width of the base can be wider than the width of the terminal edge.

The V-spring described herein can have a spring ring configuration, or annular configuration. That is, the V-spring can have a bore and the bore can be sized to receive a shaft, rod, or piston, which can be used interchangeably unless the context indicates otherwise.

The V-spring can have a body with a generally cylindrical inner circumference defining a bore having a spring ring center and an outer circumference defining an outer diameter. The spring ring center can also be the spring ring centerline of the V-spring.

The V-spring can have a plurality of interconnected V-shaped bodies. If each V-shaped body is understood to have two legs and an interconnecting part therebetween, then each V-body of the V-spring of the present invention can have two legs and two end edges, one on each leg.

Whereas a typical V-shaped body is symmetrical through the apex of the V structure and having two equal legs or two legs of an equal length, each of the V-bodies of the present V-spring can comprise two legs of un-equal lengths, which can include a long leg and a short leg joined to one another by a connecting end or a connecting portion. When measuring the two legs using the same parameters, the term longer leg or long leg is understand to mean having a greater length measurement than the shorter leg or short leg.

The long leg can have a terminal end edge that is wider than the terminal end edge of the short leg. In other examples, the relative widths can reverse so that the width of the terminal end edge of the short leg can be wider than the width of the terminal end edge of the long leg. In still other examples, the width at the base of the long leg can be equal to the width at the base of the short leg. In other examples, the widths at the two bases can be unequal. When the two legs have equal width bases and the two end edges of the two legs have different widths, then the long leg can be said to have less of a tapering running between the base and the end edge than the tapering running between the base and the end edge of the short leg.

Unlike a convention V-shaped body of a V-spring, each V-shaped bodies of the present spring can be asymmetrical along a plane passing through the apex of the V-shaped body.

Each long leg can be spaced from an adjacent long leg by a gap and each short leg and each short leg can be spaced from an adjacent short leg by a gap. The two gaps defined by the side edge surfaces of the long legs and short legs can have the same contour or be different. Further, the two gaps, as measured in distance or length, can have the same or dissimilar measurements.

If the apex of a connecting end or connecting portion of each pair of long leg and short leg serves as the base or origin of a V-body of the V-spring, the length of the long leg can extend further outwardly in the axial direction away from the origin, axially relative to the spring ring centerline, than the length of the short leg.

In some examples, the long leg can extend about 5% to 45% longer in the axial direction than the short leg. Said differently, the long leg and the short leg can both extend along a same direction and wherein the long leg can extend a greater amount in that direction, relative to an origin, than the short leg, by about 5% to 45% greater.

Each short leg can have a base near or at the apex having a width and a terminal end edge or end edge having a width and wherein the width of the base is larger than the width of the terminal end edge of the short leg. Similarly, each long leg has a base near or at the apex having a width and a terminal end edge or end edge having a width and wherein the width of the base is larger than the width of the terminal end edge of the long leg.

In an example, the V-spring can be stamped from a metal blank and then forged or cold formed into the shape shown herein. The gaps between the long and short legs allow the stamped blank to be bent into the final shape shown with the gaps allowing the legs to flex. In some examples, the metal material can be a highly conductive metal, such as bronze, copper, or alloys thereof. The spring can alternatively be made from an aluminum material. In other examples, the spring can be made from a steel material, such as stainless steel, carbon steel, or alloy steel. Optionally, the metal material may be plated with a corrosion resistant outer layer, such as titanium or HASTELLOY®. Thus, the V-spring used herein can have a single metal material formed throughout or can have a first inner metal layer surrounded by a second outer metal layer.

Seal assemblies provided herein can comprise a sealing element comprising an inside flange, an outside flange, and a center channel section, which together define a spring cavity having a spring located therein. The spring cavity can instead be referred to as a seal cavity as it is formed or defined by the sealing element for receiving a spring.

The spring used with the sealing element to energize or bias the inside flange and the outside flange away from one another can be a V-spring, which can be a V-spring provided herein. The V-spring can have a plurality of V-bodies and a plurality of inside legs biasing the inside flange against a shaft or rod to form a seal between the sealing lip of the inside flange and a surface of the shaft or rod. A sealing interface is the space or point where the surface of the sealing lip contacts a surface, such as a shaft or a housing, and forming a seal therewith to eliminate or reduce leakage thereacross. The shaft can be a dynamic shaft and a tapered nose section. That is, the shaft can rotate or can reciprocate and the sealing lip is configured to form a seal with the surface of the shaft to prevent or reduce leakage out along the interface therebetween.

The long leg can bias against the outside flange of the sealing element to bias the outside flange against the inside surface of the housing so that the sealing lip of the outside flange forms a seal with the inside surface of the housing.

A radial overhang can extend from the outside flange and can have a free end pointing in the direction of the inside flange or the shaft to reduce the opening to the spring cavity and to secure the V-spring from inadvertently popping out of the spring cavity during installation and handling of the seal assembly. Optionally, the radial overhang can be omitted or can be lengthened to extend further towards the inside flange or the shaft. The radial overhang and the portion of the outside flange connected to the radial overhang can collectively be referred to as an outside boot, which has a surface that at least partially surrounds or contains the terminal end edge of the long leg.

The inside flange of the sealing element can have an end edge at a free end that terminates at a point or along a plane that is shorter or closer to the center channel section than the end edge at the free end of the outside flange. More particularly, the end edge of the outside flange can extend further outwardly in the axial direction, axially relative to the axis of the shaft and from the respective base with the center channel section, than the end edge of the inside flange. In some examples, the end edge of the outside flange can extend about 15% to 70% further in the axial direction from the respective base with the center channel section than the end edge of the inside flange.

The long leg of the V-spring can press against the inside flange surface of the outside flange to form a line contact along about 25% to 95% of the inside flange surface to more evenly distribute the biasing force of the spring acting on the outside flange along the length of the outside flange. In contrast, the short leg is shown pressing against the inside flange surface of the inside flange along or at a single point to form a point contact, or a reduced line contact compared to the extended line contact of the long leg against the outside flange.

The point contact or reduced line contact can include a small surface area but much less than the line contact of 25% or greater of the inside flange surface. This can allow the short leg to bias the inside flange along a relatively smaller contact are to generate greater sealing force or pressure at the sealing interface with the shaft than at the interface of the housing for the extended line contact at the outside flange.

In some examples, the length of the line contact and the area of the point contact can vary by varying the angle of the long leg and the angle of the short leg extending outwardly in the axial direction from the connecting end or connecting portion. The angle of the long leg, the short leg, or both legs extending axially from the connecting end can also vary by incorporating one or more bends on the respective leg. Still further, the angle of the long leg, the short leg, or both legs extending axially from the connecting end can vary by changing the curvature or size of the connecting portion.

The reduced seal lip length of the inside flange and the short leg of the V-spring can offer several advantages that may contribute to improved seal performance. Among other things, the short leg of the V-spring can offer a higher force on the inside flange compared to a similar V-spring with equal leg lengths. The relatively shorter length of the short leg can have increased stiffness and therefore can exert a higher biasing force against the inside flange. The inside flange can also incorporate a relatively shorter sealing lip to increase the seal lip stiffness and/or decrease the sealing area with the surface of the shaft.

The surface or operating temperature during service and thus wear on the sealing lip may be reduced since the relatively shorter seal lip has less length or contact surface that comes into contact with a dynamic surface of the shaft when pressure is applied, thus reducing friction compared to a relatively longer length sealing lip having a greater surface area that can come into contact with the dynamic surface of the shaft under pressure. Additionally, the combination of a reduced sealing lip and short leg of the V-spring of the present disclosure with a long leg and a short leg decreases mass and reduces inertia of the sealing lip, which may reduce unwanted lifting of the sealing lip caused by sealing surface eccentricities during dynamic sealing or due to vibration or shock, thus increasing sealing ability.

In some examples, the V-spring used with the sealing element can be shaped differently. For example, the location of the connecting portion can be lower compared to a reference point when located inside a spring cavity so that the long leg can extend outwardly away from the connecting portion at more of an angle, and the short leg at less of an angle.

The radius or curvature of the connecting portion can be modified to be smaller or larger. The lengths of the long leg and short leg can be modified to have a smaller ratio or a larger ratio, and one or both legs can include one or more inflection points.

The seal assembly can be sized and shaped for mounting to a housing. That is, when assembled for service, the seal assembly can be configured to be mounted to a stationary housing and has a sealing element with an inside flange with a sealing lip for sealing against a piston or a shaft. In alternative embodiments, the seal assembly can be modified to be piston or shaft mounted. That is, when assembled for service, the modified seal assembly can be configured to be mounted onto a piston or a shaft and the combination piston and modified seal assembly placed into a housing. The modified seal assembly may be referred to as a piston mounted seal assembly.

A piston mounted seal assembly can comprise a sealing element and a V-spring comprising a plurality of long legs and short legs located in a spring cavity of the sealing element. The piston mounted seal assembly can be located on the piston against a stepped surface or shoulder formed with the shaft. The shoulder can have a height and the height of the shoulder can extend the same height of the center channel section of the sealing element. The piston and seal assembly are located within a seal gland of the housing.

For a piston mounted seal assembly, the arrangement of the long and short legs of the V-spring and the inside and outside seal flanges of the sealing element are modified. The inside flange is now arranged to be in contact with the surface of the shaft and the outside flange is now arranged to be in contact with the inner surface of the housing. The inside flange can have a sealing lip that is biased by the V-spring to seal against the housing while the outside flange can have a sealing lip that is biased by the V-spring to seal against the shaft. Compared to a housing mounted seal assembly, the piston mounted seal assembly has an inside flange and an outside flange of the sealing element that are reversed.

The V-spring used with a piston mounted sealing element can be similar to other V-springs described elsewhere herein except for the modified arranged between the long leg and the short leg. The short leg is configured to bias outwardly against the outside flange of the sealing element and the long leg is configured to bias outwardly against the inside flange of the sealing element. Compared to the V-spring of a housing mounted seal assembly, the present long leg and short leg of the piston mounted seal assembly are reversed.

In some examples, a backing ring may be incorporated with the seal assembly. The backing ring may be made from a metal material or a composite material and can be placed in contact with the center channel section of the sealing element, which when incorporated is configured to then contact the housing and not the center channel section of the sealing element. The backing ring can be provided to provided support to the sealing element, especially in high pressure applications that may tend to push the sealing element in the direction end edge 186 towards the center channel section.

In some examples, a locking ring may be incorporated with the seal assembly, with or without a backing ring. When incorporated, the locking ring can have a first section extending into the spring cavity and in contact with the outside flange. The long leg of the V-spring would then bias against the first section of the locking ring. The locking ring can have a second section attached to the first section, such as being unitarily formed with the first section. The second section can be located externally of the spring cavity and can extend towards the inside surface of the housing and bias against the housing. A cantilever spring may be provided with the second section to bias against the surface of the housing.

In an alternative annular spring energized seal assembly, the short leg biases outwardly against the inside flange of the sealing element and the long leg biases outwardly against the outside flange of the sealing element. However, the one or both legs can have additional leg features.

In an example, the short leg of the V-spring can be provided with a bend or a bent section to change the projection of a terminal end section of the short leg relative to the base section of the short leg. Said differently, if the short leg has a linear profile extending from the connecting end, the bend or bent section is an inflection point between the base section and the terminal end section of the short leg.

The terminal end edge of the short leg can be located at an end of the terminal end section. The length of the of the base section of the short leg on one side of the inflection point can be substantially longer than the length of the terminal end section, which is located on the other side of the inflection point. In an example, the base section can have a length that is about 1.5 times to about 6 times longer than the length of the terminal end section. In other examples, the length of the base section can be longer.

In some examples, there can be more than one bend or bent section, i.e., more than one inflection point, incorporated with the short leg. By increasing the number of inflection points, the surface of the terminal end section that comes into contact with the inner flange surface of the inside flange can be flatter with the surface of the outside flange and less angled. The multiple inflection points, when incorporated, can act as a smoothing function to turn the part of the long or short leg that comes into contact with the sealing flange to be flatter, at least relatively flatter.

The one or more bends can be incorporated with the short leg of the V-spring to reduce the likelihood of the terminal end edge of the sort leg from digging into the interior flange surface of the inside flange, which can damage or deform the sealing lip of the inside flange and reduce seal performance. In other words, the one or more bends on the short leg can modify the contact point between the free end of the short leg and the inside flange surface to an extended point contact or a short line contact while still retaining all of the advantages discussed elsewhere herein.

In some examples, there can be one or more bend sections or inflection points incorporated with the long leg. By incorporating one or more inflection points with the long leg, the location of the connecting portion of the V-body as the V-spring seats within the spring cavity relative to the center channel section of the seal element can be adjusted and still allow for the long leg to contact the inside flange surface of the outside flange to provide a line contact or a shortened line contact.

In some examples, both the short leg and the long leg of each V-body can have one or more inflection points. In rare circumstances, only some but not all of the V-bodies can have long leg, short leg, or both long and short legs with one or more inflection points.

The seal assembly be housing mounted when placed in service to seal against a shaft. In other examples, the seal assembly may be modified to be piston mounted.

In yet another alternative embodiment, the inside flange of a sealing element can be provided with an inside boot at the end of the inside flange. The inside boot can resemble or be similar to the outside boot and can provide the similar function of surrounding the terminal end edge of the short leg. Additionally, the added length on the outside surface at the inside boot can provide added line contact with the surface of a shaft when the seal assembly of FIG. 5 is mounted onto the shaft.

As described herein, the inside flange and the outside flange of a sealing element can each comprise an inner surface and an outer surface of the respective flange. For example, the inside flange can have an inner surface and an outer surface and the outside flange can have an inner surface and an outer surface. The terms inner and outer can be relative to the space between the inside flange and the outside flange, such as relative to the spring cavity.

Methods of making and of using the seal assemblies and components thereof, such as the various V-springs, are within the scope of the present invention.

DESCRIPTION OF DRAWINGS

These and other features and advantages of the present devices, systems, and methods will become appreciated as the same becomes better understood with reference to the specification, claims and appended drawings wherein:

DETAILED DESCRIPTION OF THE ILLUSTRATED EMBODIMENTS

The detailed description set forth below in connection with the appended drawings is intended as a description of the presently preferred embodiments of V-springs and spring energized seals with V-springs provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
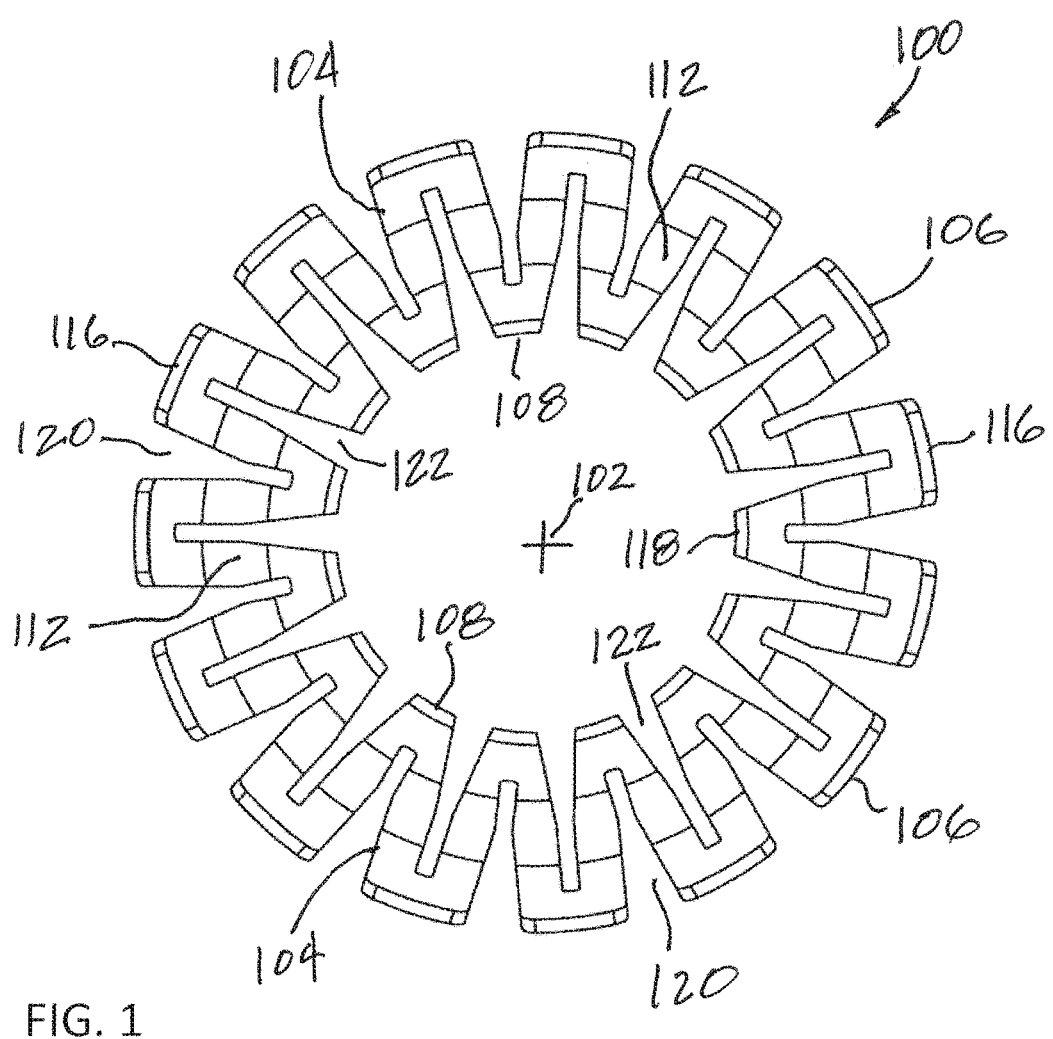
FIG. 1 shows a V-spring in a spring ring configuration in which the long legs of the V-bodies are located along the outside circumference of the spring ring and the short legs are located along the inner or inside circumference.

With reference now to FIG. 1, a V-spring 100 in a spring ring configuration, or annular configuration, is shown, which has a generally cylindrical inner circumference defining a bore having a spring ring center 102 and an outer circumference defining an outer diameter. The spring ring center 102 can also be the spring ring centerline of the V-spring 100.

If each V-shaped body is understood to have two legs and an interconnecting part therebetween, then FIG. 1 shows a rear plan view of the V-spring 100 of the present invention, which shows two end edges 116, 118 of two legs 106, 108 of a plurality of interconnected V-bodies 104. Whereas a typical V-shaped body is symmetrical through the apex of the V structure and having two equal legs, each of the V-bodies 104 of the present V-spring 100 comprises two legs of unequal lengths, which can include a long leg 106 and a short leg 108 joined to one another by a connecting end or a connecting portion 112. When measuring the two legs 106, 108 using the same parameters, the term longer leg is understand to mean having a greater length measurement than the shorter leg.

The long leg 106 can have a terminal end edge 116 that is wider than the terminal end edge 118 of the short leg 108. In other examples, the relative widths can reverse so that the width of the terminal end edge 118 of the short leg 108 can be wider than the width of the terminal end edge 116 of the long leg. In still other examples, the width at the base of the long leg can be equal to the width at the base of the short leg. In other examples, the widths at the two bases can be unequal. Unlike a convention V-shaped body of a V-spring, each V-shaped bodies 104 of the present spring 100 can be asymmetrical along a plane through the apex of the V-shaped body.

Each long leg 106 can be spaced from an adjacent long leg 106 by a gap 120 and each short leg 108 and each short leg 108 can be spaced from an adjacent short leg 108 by a gap 122. The two gaps 120, 122, defined by the side edge surfaces of the long legs and short legs, can have the same contour or be different. Further, the two gaps 120, 122, as measured in distance or length, can have the same or dissimilar measurements.

Figure 2:
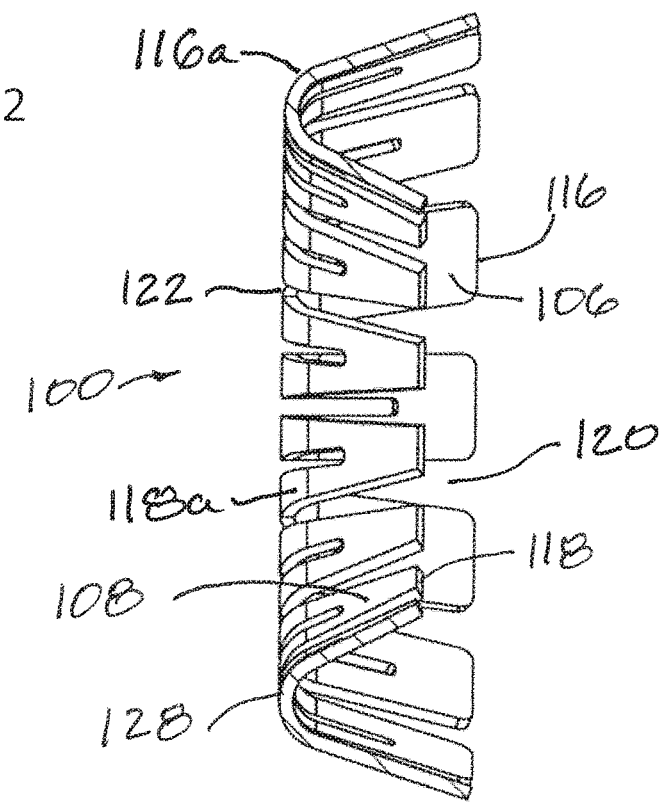
FIG. 2 shows a perspective sectional view of the spring ring of FIG. 1, clearly showing a V-spring with a plurality of V-bodies each with a short leg and a long leg.

FIG. 2 shows a perspective sectional view of the spring ring of FIG. 1, which clearly shows a V-spring 100 with a plurality of V-bodies 104 each with a short leg 108 and a long leg 106. If the apex 128 of a connecting end or connecting portion 112 of each pair of long leg and short leg serves as the base or origin of a V-body 104, the length of the long leg 106 extends further outwardly in the axial direction away from the origin, axially relative to the spring ring centerline, than the length of the short leg 108. In some examples, the long leg 106 extends about 5% to 45% longer in the axial direction than the short leg 108. Said differently, the long leg and the short leg can both extend along a same direction and wherein the long leg can extend a greater amount in that direction, relative to an origin, than the short leg, by about 5% to 45% greater.

As shown, each short leg 108 has a base 118a near or at the apex 128 having a width and a terminal end edge 118 having a width and wherein the width of the base 118a is larger than the width of the terminal end edge 118 of the short leg 108. Similarly, each long leg 106 has a base 116a near or at the apex 128 having a width and a terminal end edge 116 having a width and wherein the width of the base 116a is larger than the width of the terminal end edge 116 of the long leg 106.

In an example, the V-spring 100 can be stamped from a metal blank and then forged or cold formed into the shape shown in FIGS. 1 and 2. The gaps 120, 122 allow the stamped blank to be bent into the final shape shown. In some examples, the metal material can be a highly conductive metal, such as bronze, copper, or alloys thereof. The spring can alternatively be made from an aluminum material. In other examples, the spring can be made from a steel material, such as stainless steel, carbon steel, or alloy steel. Optionally, the metal material may be plated with a corrosion resistant outer layer, such as titanium or HASTELLOY®. Thus, the V-spring used herein can have a single metal material formed throughout or can have a first inner metal layer surrounded by a second outer metal layer.

Figure 3:
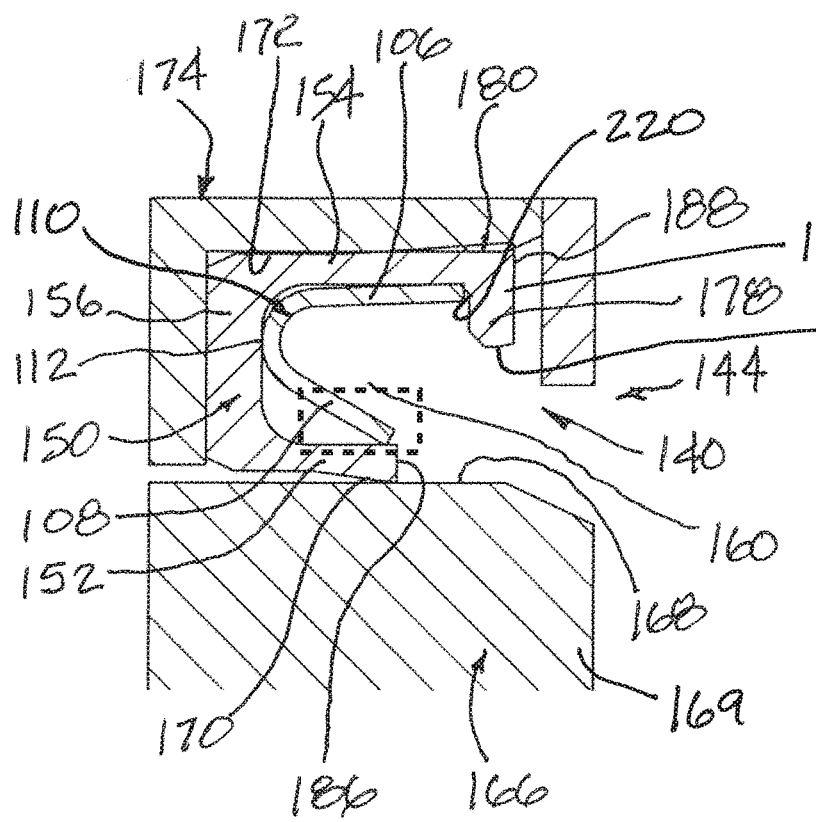
FIG. 3 shows a side cross-sectional view of a spring energized seal assembly in which a short leg of a V-spring body energizes the inside flange of the sealing element against a shaft or rod and the long leg energizes the outer or outside flange against a surface, such as a surface of a housing.

FIG. 3 shows a cross-sectional view of a spring energized seal assembly 140 located in a seal gland 144. As shown, the seal assembly 140 comprises a sealing element 150 comprising an inside flange 152, an outside flange 154, and a center channel section 156, which together define a spring cavity 160 having a spring located therein. The spring cavity 160 can instead be referred to as a seal cavity as it is formed or defined by the sealing element 150 for receiving a spring.

The spring used with the sealing element 150 to energize or bias the inside flange 152 and the outside flange 154 away from one another can be a V-spring 100, which can be a V-spring provided herein. As shown in FIG. 3, the V-spring has a plurality of V-bodies (only one shown) and a plurality of inside legs (only one shown) 108 biasing the inside flange 152 against a shaft or rod 166 to form a seal between the sealing lip 170 of the inside flange 152 and a surface 168 of the shaft or rod 166. The shaft 166 can be a dynamic shaft and a tapered nose section 169. That is, the shaft 166 can rotate or can reciprocate and the sealing lip 170 is configured to form a seal with the surface 168 of the shaft to prevent or reduce leakage out along the interface therebetween.

The long leg 108 biases against the outside flange 154 of the sealing element 150 to bias the outside flange 154 against the inside surface 172 of the housing 174 so that the sealing lip 180 of the outside flange 154 forms a seal with the inside surface 172 of the housing. A radial overhang 178 can extend from the outside flange 154 and can have a free end 153 pointing in the direction of the inside flange or the shaft to reduce the opening to the spring cavity 160 and to secure the V-spring 100 from inadvertently popping out of the spring cavity during installation and handling of the seal assembly 140. Optionally, the radial overhang 178 can be omitted or can be lengthened to extend further towards the inside flange or the shaft. The radial overhang 178 and the portion of the outside flange 154 connected to the radial overhang can collectively be referred to as an outside boot 179, which has a surface that at least partially surrounds or contains the terminal end edge 116 of the long leg 106.

As shown, the inside flange 152 has an end edge 186 at a free end that terminates at a point or along a plane that is shorter or closer to the center channel section 156 than the end edge 188 at the free end of the outside flange 154. More particularly, the end edge 188 of the outside flange 154 extends further outwardly in the axial direction, axially relative to the axis of the shaft 166 and from the respective base with the center channel section 156, than the end edge 186 of the inside flange 152. In some examples, the end edge 188 of the outside flange 154 extends about 15% to 70% further in the axial direction from the respective base with the center channel section 156 than the end edge 186 of the inside flange 152.

With further reference to FIG. 3, the long leg 106 of the V-spring 100 is shown pressing against the inside flange surface of the outside flange 154 to form a line contact along about 25% to 95% of the inside flange surface to more evenly distribute the biasing force of the spring acting on the outside flange 154 along the length of the outside flange. In contrast, the short leg 108 is shown pressing against the inside flange surface of the inside flange 152 along or at a single point to form a point contact, or a reduced line contact compared to the extended line contact of the long leg 106 against the outside flange 154. The point contact or reduced line contact can include a small surface area but much less than the line contact of 25% or greater of the inside flange surface. This allows the short leg 108 to bias the inside flange 152 along a relatively smaller contact are to generate greater sealing force or pressure at the sealing interface with the shaft 166 than at the interface of the housing 174 for the extended line contact at the outside flange.

In some examples, the length of the line contact and the area of the point contact can vary by varying the angle of the long leg 106 and the angle of the short leg 108 extending outwardly in the axial direction from the connecting end or connecting portion 112. The angle of the long leg, the short leg, or both legs extending axially from the connecting end can also vary by incorporating one or more bends on the respective leg, as further discussed below. Still further, the angle of the long leg, the short leg, or both legs extending axially from the connecting end can vary by changing the curvature or size of the connecting portion 112.

The reduced seal lip length of the inside flange 152 and the short leg 108 of the V-spring 100 can offer several advantages that may contribute to improved seal performance. Among other things, the short leg 108 of the V-spring 100 offers higher force on the inside flange compared to a similar v-spring with equal leg lengths. The relatively shorter length of the short leg 108 has increased stiffness and therefore can exert a higher biasing force against the inside flange 152. The inside flange 152 can also incorporate a relatively shorter sealing lip 170 to increase the seal lip stiffness and/or decrease the sealing area with the surface of the shaft.

Furthermore, temperature and thus wear on the sealing lip 170 may be reduced since the relatively shorter seal lip 170 has less length or contact surface that comes into contact with a dynamic surface of the shaft 166 when pressure is applied, thus reducing friction compared to a relatively longer length sealing lip having a greater surface area that can come into contact with the dynamic surface of the shaft under pressure. Additionally, the combination of a reduced sealing lip and short leg of the V-spring of the present disclosure with a long leg and a short leg decreases mass and reduces inertia of the sealing lip, which may reduce unwanted lifting of the sealing lip caused by sealing surface eccentricities during dynamic sealing or due to vibration or shock, thus increasing sealing ability.

In some examples, the V-spring 100 used with the sealing element 150 can be shaped differently than as shown in FIG. 3. For example, the location of the connecting portion 112 can be lower so that the long leg can extend outwardly away from the connecting portion at more of an angle, and the short leg at less of an angle. The radius or curvature of the connecting portion 112 can be modified to be smaller or larger. The lengths of the long leg and short leg can be modified to have a smaller ratio or a larger ratio, and one or both legs can include one or more inflection points, similar to point 194 of FIG. 4.

The seal assembly 140 of FIG. 3 is sized and shaped for mounting to a housing. That is, when assembled for service, the seal assembly of FIG. 3 is configured to be mounted to a stationary housing 174 and has a sealing element 150 with an inside flange 152 with a sealing lip 170 for sealing against a piston or a shaft. In alternative embodiments, the seal assembly 140 can be modified to be piston or shaft mounted. That is, when assembled for service, the modified seal assembly is configured to be mounted onto a piston or a shaft and the combination piston and modified seal assembly placed into a housing. The modified seal assembly may be referred to as a piston mounted seal assembly.

Figure 3A:
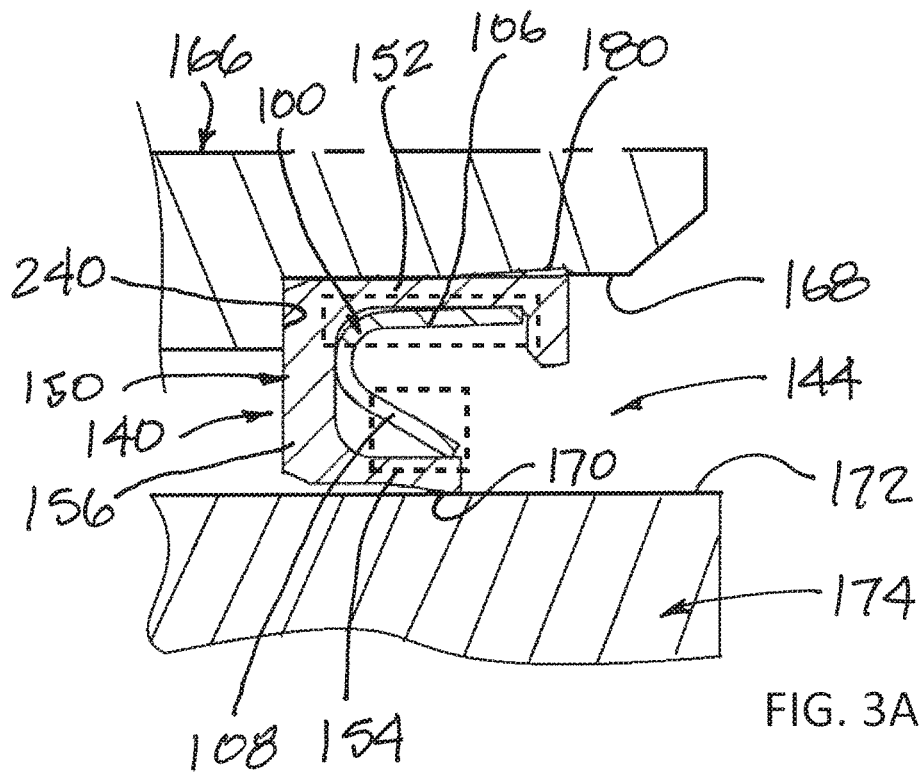
FIG. 3A shows a side cross-sectional view of a spring energized seal assembly in which a short leg of a V-spring body energizes the outside flange of the sealing element against a surface, such as a surface of a housing, and the long leg energizes the outer or outside flange against a rod, shaft or piston.

With reference now to FIG. 3A, a piston mounted seal assembly 140 is shown. The alternative annular spring energized seal assembly 140 comprises a sealing element 150 and a V-spring 100 comprising a plurality of long legs 106 (only one shown) and short legs 108 (only one shown) located in a spring cavity 160 of the sealing element 150, similar to the embodiment of FIG. 3 with a few exceptions. In the present embodiment, the seal assembly 140 is piston mounted and is located on the piston 166, against a stepped surface or shoulder 240. The piston 166 and seal assembly 140 are located within a seal gland 144 of the housing 174.

As the seal assembly of FIG. 3A is piston mounted, the arrangement of the long and short legs of the V-spring 100 and the inside and outside seal flanges of the sealing element 150 are modified. As shown, the inside flange 152 is now arranged to be in contact with the surface of the shaft 166 and the outside flange 154 is now arranged to be in contact with the inner surface 172 of the housing 174. The inside flange 152 has a sealing lip 180 that is biased by the V-spring to seal against the housing while the outside flange 154 has a sealing lip 170 that is biased by the V-spring to seal against the shaft. Compared to the sealing element 150 of FIG. 3, the present inside flange and outside flange of the sealing element are reversed due to its piston mounted arrangement.

The V-spring 100 used with the sealing element 150 of FIG. 3A can be similar to other V-springs described elsewhere herein. As shown, the short leg 108 biases outwardly against the outside flange 154 of the sealing element 150 and the long leg 106 biases outwardly against the inside flange 154 of the sealing element. Compared to the V-spring 100 of FIG. 3, the present long leg 106 and short leg 108 are reversed due to its piston mounted arrangement.

In some examples, a backing ring may be incorporated with the seal assembly. The backing ring may be made from a metal material or a composite material and can be placed in contact with the center channel section 156 of the sealing element 150, which when incorporated is configured to then contact the housing and not the center channel section of the sealing element. The backing ring can be provided to provide support to the sealing element, especially in high pressure applications that may tend to push the sealing element in the direction end edge 186 towards the center channel section.

In some examples, a locking ring may be incorporated with the seal assembly, with or without a backing ring. When incorporated, the locking ring can have a first section extending into the spring cavity 160 and in contact with the outside flange 154. The long leg 106 of the V-spring would then bias against the first section of the locking ring. The locking ring can have a second section attached to the first section, such as being unitarily formed with the first section. The second section can be located externally of the spring cavity 160 and can extend towards the inside surface of the housing and bias against the housing. A cantilever spring may be provided with the second section to bias against the surface 172 of the housing 174.

For the seal assemblies and components disclosed herein, including V-springs, it is understood that where a feature is shown but not expressly described and is otherwise the same or similar to the feature or features described elsewhere, such as above with reference to FIGS. 1-3, the disclosed part or parts shown in the drawing figures but not expressly described because of redundancy and because knowledge is built on a foundation laid by earlier disclosures may nonetheless be understood to be described or taught by the same or similar features expressly set forth in the text for the embodiments in which the feature or features are described. Said differently, subsequent disclosures of the present application are built upon the foundation of earlier disclosures unless the context indicates otherwise. The disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following seal assemblies incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

Figure 4:
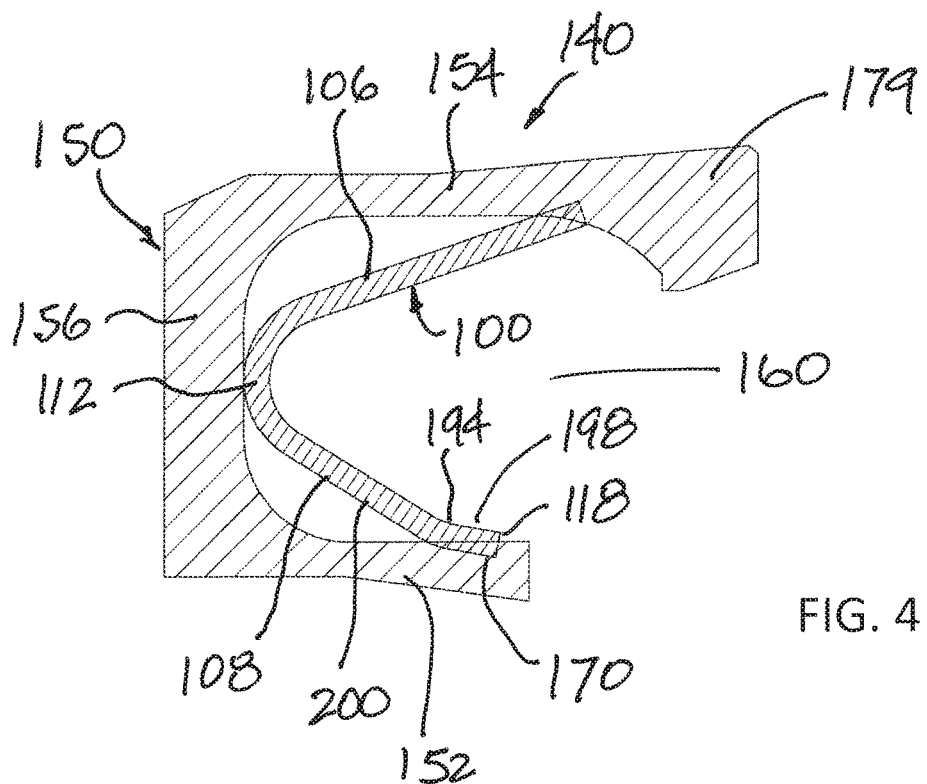
FIG. 4 shows a side cross-sectional view of a spring energized seal assembly in which a short leg of a V-spring body, with a bent section, energizing the inner flange of the sealing element against a shaft or rod.

FIG. 4 depicts a cross-sectional view of a section of an alternative annular spring energized seal assembly 140 comprising a sealing element 150 and a V-spring 100 comprising a plurality of long legs 106 (only one shown) and short legs 108 (only one shown) located in a spring cavity 160 of the sealing element 150, similar to the embodiment of FIG. 3 with a few exceptions. In the present embodiment, the short leg 108 biases outwardly against the inside flange 152 of the sealing element 150 and the long leg 106 biases outwardly against the outside flange 154 of the sealing element.

As shown, the short leg 108 of the V-spring 100 is provided with a bend or a bent section 194 to change the projection of a terminal end section 198 of the short leg 108 relative to the base section 200 of the short leg 108. Said differently, if the short leg 108 has a linear profile extending from the connecting end 112, the bend or bent section 194 is an inflection point between the base section 200 and the terminal end section 198 of the short leg 108. The terminal end edge 118 of the short leg 108 is located at an end of the terminal end section 198. As shown, the length of the of the base section 200 of the short leg 108 on one side of the inflection point 194 is substantially longer than the length of the terminal end section 198, which is located on the other side of the inflection point. In an example, the base section 200 can have a length that is about 1.5 times to about 6 times longer than the length of the terminal end section 198.

In some examples, there can be more than one bend or bent section 194, i.e., more than one inflection point, incorporated with the short leg 108. By increasing the number of inflection points, the surface of the terminal end section 198 that comes into contact with the inner flange surface of the inside flange 152 can be flatter with the surface of the outside flange and less angled than as shown in FIG. 3. The one or more bends 194 can be incorporated with the short leg 108 of the V-spring to reduce the likelihood of the terminal end edge 118 of the sort leg 108 from digging into the interior flange surface of the inside flange 152, which can damage or deform the sealing lip 170 of the inside flange 152 and reduce seal performance. In other words, the one or more bends 194 on the short leg 108 can modify the contact point between the free end of the short leg and the inside flange surface to an extended point contact or a short line contact while still retaining all of the advantages discussed elsewhere herein.

In some examples, there can be one or more bend sections or inflection points incorporated with the long leg 106. By incorporating one or more inflection points with the long leg 106, the location of the connecting portion 112 of the V-body as the V-spring seats within the spring cavity 160 relative to the center channel section 156 of the seal element 150 can be adjusted and still allow for the long leg to contact the inside flange surface of the outside flange 154 to provide a line contact or a shortened line contact.

The seal assembly 140 of FIG. 4 may be housing mounted when placed in service to seal against a shaft, similar to the embodiment of FIG. 3. In other examples, the seal assembly of FIG. 4 may be modified to be piston mounted, similar to the embodiment of FIG. 3A.

Figure 5:
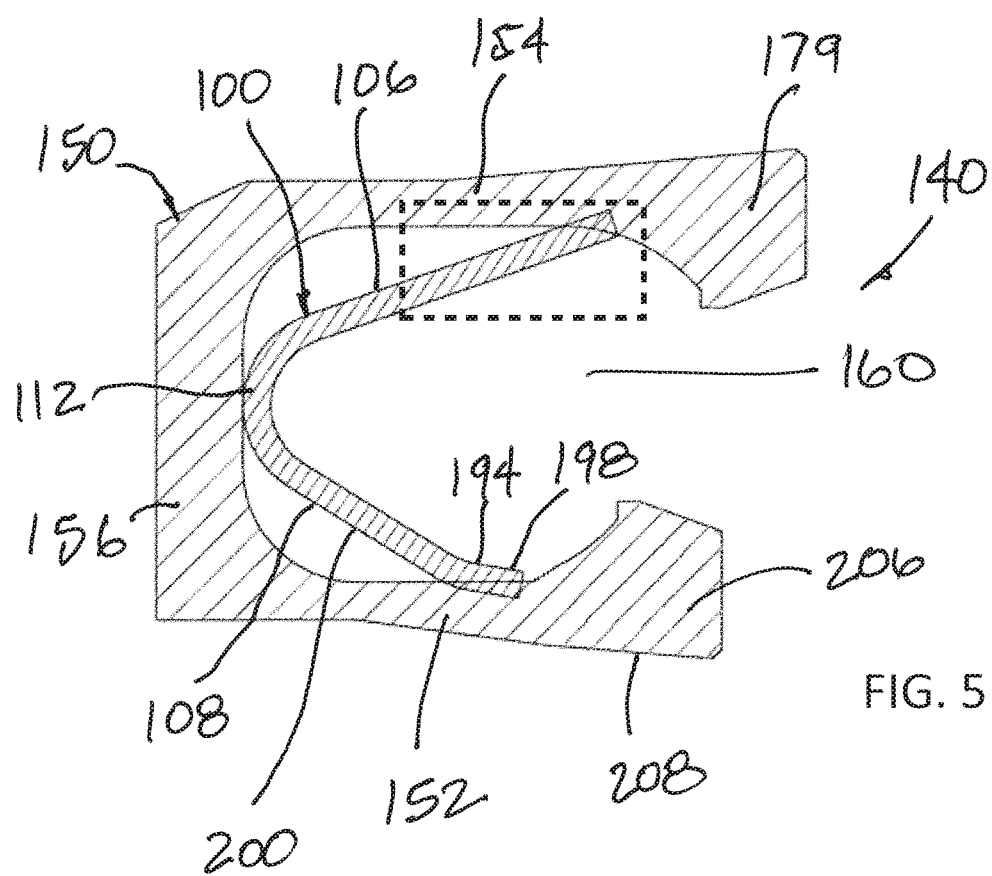
FIG. 5 shows a side cross-sectional view of a spring energized seal assembly in which the inside flange of the sealing element has an inner boot.

With reference now to FIG. 5, a cross-sectional view of a section of an alternative annular spring energized seal assembly 140 comprising a sealing element 150 and a V-spring 100 comprising a plurality of long legs 106 (only one shown) and short legs 108 (only one shown) located in a spring cavity 160 of the sealing element, similar to the embodiment of FIG. 5 with a few exceptions. In the present embodiment, the inside flange 152 is provided with an inside boot 206 at the end of the inside flange 152. The inside boot 206 can resemble or be similar to the outside boot 179 and can provide the similar function of surrounding the terminal end edge 118 of the short leg 108. Additionally, the added length on the outside surface 208 at the inside boot 206 can provide added line contact with the surface of a shaft when the seal assembly of FIG. 5 is mounted onto the shaft.

The seal assembly 140 of FIG. 5 may be housing mounted when placed in service to seal against a shaft, similar to the embodiment of FIG. 3. In other examples, the seal assembly of FIG. 5 may be modified to be piston mounted, similar to the embodiment of FIG. 3A.

As described herein, the inside flange and the outside flange of a sealing element each comprises an inner surface and an outer surface of the respective flange. For example, the inside flange can have an inner surface and an outer surface and the outside flange can have an inner surface and an outer surface. The terms inner and outer can be relative to the space between the inside flange and the outside flange, such as the spring cavity.

Methods of making and of using the seal assemblies and components thereof, such as the various V-springs, are within the scope of the present invention.

Although limited embodiments of the seal assemblies and their components have been specifically described and illustrated herein, many modifications and variations will be apparent to those skilled in the art. For example, the various alternative V-spring configurations may incorporate other metal materials or plating materials not specifically identified, etc. Furthermore, it is understood and contemplated that features specifically discussed for one seal embodiment may be adopted for inclusion with another seal embodiment, provided the functions are compatible. For example, the long leg and/or short leg of the V-spring of FIG. 3 may include one or more inflection points to change the shape of V-spring. Accordingly, it is to be understood that the seal assemblies and their components constructed according to principles of the disclosed device, system, and method may be embodied other than as specifically described herein. The disclosure is also defined in the following claims.

What is claimed is:

1. A seal assembly comprising:
a sealing element having an inside flange with a sealing lip, an outside flange with a sealing lip, and a center channel section defining a spring cavity, said outside flange extending in a first direction from the center channel section a longer distance than said inside flange when mounted onto a piston;

a V-spring located in the spring cavity, said V-spring comprising a plurality of V-bodies and wherein each V-body comprises a long leg extending in the first direction from a connecting portion a longer distance than a short leg extending from the connecting portion;

wherein said long leg forms a line contact with an inside surface of said outside flange, said line contact with said outside flange having a first length;

wherein said short leg has a terminal edge, and wherein said short leg is biased against an inside surface of said inside flange proximate said terminal edge and said short leg being spaced from said inside surface of said inside flange at a base section of said short leg, which is between said connecting portion and said terminal edge, to form either a point contact or a reduced line contact with said inside surface of said inside flange proximate said terminal edge; and wherein when said reduced line contact is formed with said short leg, said reduced line contact with said inside flange has a second length, which is shorter than the first length.

2. The seal assembly according to claim 1, wherein said short leg has a bend, the reduced line contact, and a terminal end section having a different profile than the base section of the short leg.

3. The seal assembly according to claim 1, further comprising a first surface, a first sealing interface, a second surface, and a second interface; wherein said sealing lip of said inside flange seals against said first surface and said sealing lip of said outside flange seals against said second surface.

4. The seal assembly according to claim 3, wherein said first sealing interface is a contact area between said sealing lip of said inside flange and said first surface.

5. The seal assembly of claim 4, wherein a force is applied to said first sealing interface by the point contact or the reduced line contact between the short leg and the inside flange.

6. The seal assembly according to claim 3, wherein said first surface is a surface of a piston.

7. The seal assembly according to claim 1, wherein the long leg extends in the first direction from the connecting portion at a first angle and the short leg extends from the connecting portion at a second angle, and wherein the first angle and the second angle are unequal.

8. The seal assembly according to claim 1, wherein the short leg provides a seal force on the inside flange that is higher than a seal force provided by the long leg on the outside flange.

9. A seal assembly comprising:

a sealing element having an outside flange with a sealing lip, an inside flange with a sealing lip defining a bore having a bore axis, and a center channel section; said outside flange, inside flange, and center channel section defining a spring cavity and said inside flange extending in a first axial direction from said center channel section a longer distance than said outside flange extending in the first axial direction from said center channel section when a shaft is located within the bore of the sealing element;

a V-spring located in the spring cavity without a separate second spring, said V-spring comprising a plurality of V-bodies and wherein each V-body comprises a long leg extending in the first axial direction from a connecting portion a longer distance than a short leg extending in the first axial direction from said connecting portion; and wherein said short leg has a terminal edge and said short leg forms a point contact with an inside surface of said outside flange, and said long leg forms a line contact with an inside surface of said inside flange.

10. The seal assembly according to claim 9, wherein said short leg has a base section, and wherein the base section of the short leg is spaced from the inside surface of the outside flange.

11. The seal assembly according to claim 9, further comprising a surface and a sealing interface; wherein said sealing lip of said outside flange seals against said surface.

12. The seal assembly according to claim 11, wherein said sealing interface is a contact area between said sealing lip of said outside flange and said surface.

13. The seal assembly according to claim 11, wherein the long leg has a base section located between the connecting portion and a terminal edge, and wherein at least part of the base section of the long leg is spaced from the inside surface of the inside flange.

14. The seal assembly according to claim 9, wherein the long leg extends in the first axial direction from the connecting portion at a first angle and the short leg extends from the connecting portion at a second angle, and wherein the first angle and the second angle are unequal.

15. The seal assembly according to claim 10, wherein at least part of the base section of the short leg is spaced from the inside surface of the outside flange.

* * * * *